Aug. 23, 1932.                    B. J. SANFORD                    1,872,823
                                  TRAILER TRUCK
                          Filed April 17, 1931    2 Sheets-Sheet 1

INVENTOR.
BERT J. SANFORD
BY H. Q. Clayton
ATTORNEY

Aug. 23, 1932.  B. J. SANFORD  1,872,823
TRAILER TRUCK
Filed April 17, 1931   2 Sheets-Sheet 2

INVENTOR.
BERT J. SANFORD
BY H. O. Clayton
ATTORNEY

Patented Aug. 23, 1932

1,872,823

UNITED STATES PATENT OFFICE

BERT J. SANFORD, OF SOUTH BEND, INDIANA, ASSIGNOR TO BENDIX BRAKE COMPANY, OF SOUTH BEND, INDIANA, A CORPORATION OF ILLINOIS

TRAILER TRUCK

Application filed April 17, 1931. Serial No. 530,850.

This invention relates to a drayage structure, and more particularly to means for loading goods to be transported upon a trailer truck.

In the modern manufacturing plant, large quantities of material are transported from place to place, and in such transportation the power propelled lift truck plays an important part. The usual practice is to employ the lift truck to transport, from place to place, loaded platforms. Obviously the efficiency of such transportation would be enhanced were a plurality of such platforms to be moved at one time; therefore, the principal object of my invention is to provide a method and means for effecting this result.

Briefly, there is suggested a combined trailer truck, lift truck and platform combination, the units to be so constructed and arranged as to facilitate the construction of a train of trailer trucks each loaded with a platform.

Figure 1:
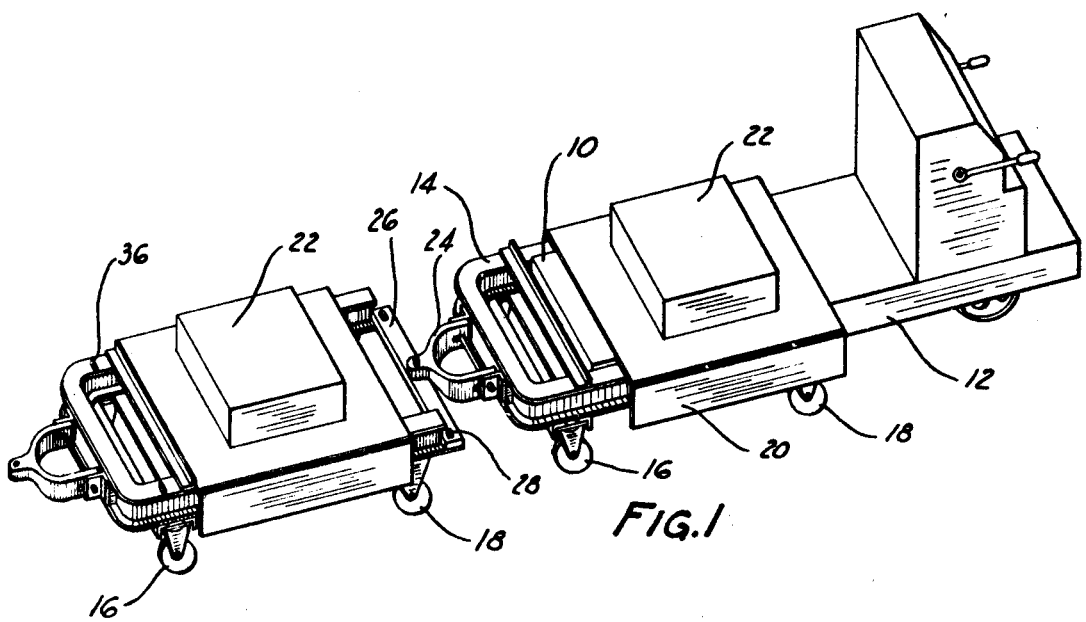
Figure 2:
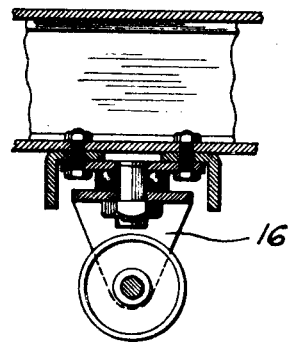
Figure 3:
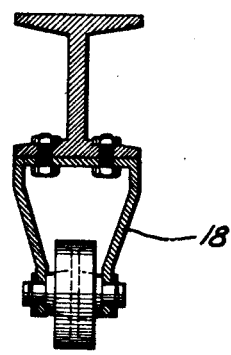
Figure 4:
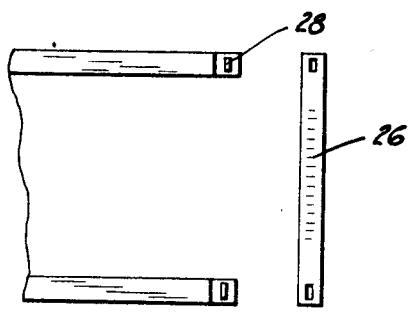
Figure 5:
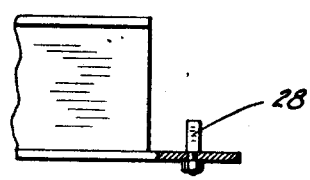
Figures 6, 7:
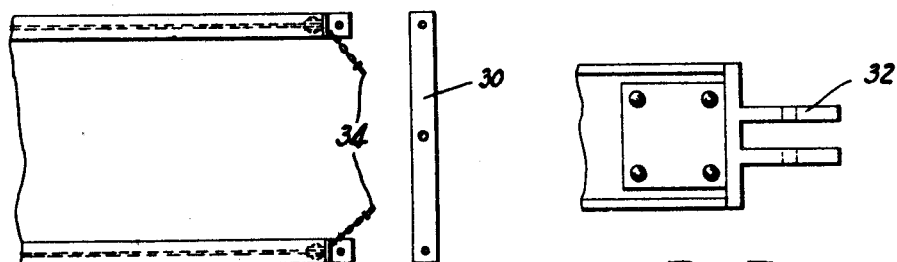

Other objects of the invention and desirable details of construction of the various units will become apparent from the following detailed description of a preferred embodiment of my invention, which embodiment is disclosed in detail in the accompanying drawings, in which:

Figure 1 discloses the essence of the invention in showing the relative position of the assembled units during the act of forming the trailer train;

Figures 2 and 3 disclose, respectively, sections on lines 2—2 and 3—3 of Figure 1 indicating in detail the front and rear wheel support structures of the trailer truck;

Figures 4 and 5 disclose details of the draw bar structure of the trailer truck;

Figures 6 and 7 disclose details of a modified form of draw bar; and

Figure 8:
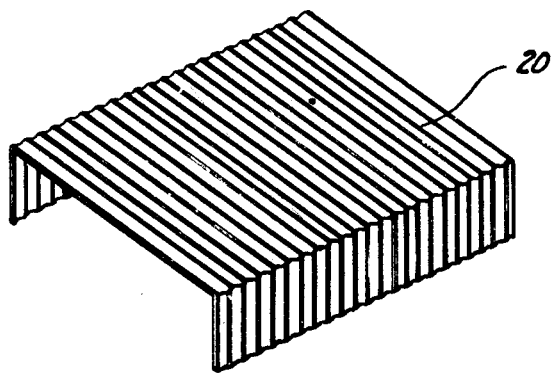

Figure 8 discloses, in perspective, one form of platform adapted to be employed in my invention.

As disclosed in Figure 1, the rear end 10 of the platform portion of a lift truck 12 is adapted to telescope within a trailer truck member 14, the U-shape defined by the I beam side walls of the latter truck being so proportioned as to receive the aforementioned body member 10. The trailer truck is preferably provided with dirigible front wheels 16, Figure 2, and non-dirigible rear wheels 18, Figure 3. As a particular feature of the invention, a channel-shaped platform member 20 with supported goods 22 is constructed to extend over and be supported by the aforementioned side rails or I beam members of the trailer truck.

In practicing the invention, the platform 20, which is preferably corrugated, Figure 8, is mounted on the platform 10 of the lift truck in the usual manner, that is by sufficiently lowering the platform 10, and telescoping it within the loaded platform 20 and then raising the platform. The truck 12 with its load is then transported to the trailer and the aforementioned telescopic operation carried into effect to position the loaded platform upon the trailer.

After lowering the lift platform the lift truck is withdrawn, leaving the loaded platform 20 securely in place on its supporting trailer. A plurality of such loaded trailers are preferably attached to one another by means of cooperating draft gear parts 24 and 26, part 26 being detachably mounted on pins 28, Figures 4 and 5, on the end of the trailer. As disclosed in Figures 6 and 7, the bar 30 may be slidingly received within apertured forked ends 32 on the trailer, pins 34 securing the parts together. When not in use, the bar 26 may be supported on pins 36 on the body of the trailer truck.

After having formed the desired train of trailers, the whole may be transported as a unit to the desired destination. The invention thus provides a very simple means for increasing the transportation efficiency in this type of factory work.

While I have described a preferred embodiment of my invention, I do not wish to be necessarily limited thereto, or otherwise than by the terms of the appended claims.

I claim:

1. A drayage unit comprising a U-shaped trailer truck, a lift truck provided with a platform adapted to telescope within the outline of the aforementioned trailer truck, and a channel-shaped goods supporting platform to be transported, said latter platform adapted to be telescoped by and supported upon said lift truck platform, the relative widths of the trailer truck, lift truck platform and the platform to be transported being such as to permit the U-shaped trailer truck to telescopingly receive both the lift truck platform and the goods supporting platform to thereby permit said channel sectioned goods supporting platform to be mounted on and telescoped over the walls of the trailer truck.

2. A method of transporting goods comprising mounting said goods on a support member of channel section, mounting said member on a lift truck in such fashion as to provide longitudinally extending clearance openings between the platform of said truck and the side walls of said channel-shaped support member, telescoping the side walls of a U-shaped trailer truck within said aforementioned clearance openings to thereby mount the support member on the trailer truck, withdrawing said lift truck from the assembly, coupling together a plurality of such truck and then moving the train of trucks to the desired destination.

In testimony whereof, I have hereunto signed my name.

BERT J. SANFORD.